Figure 1:
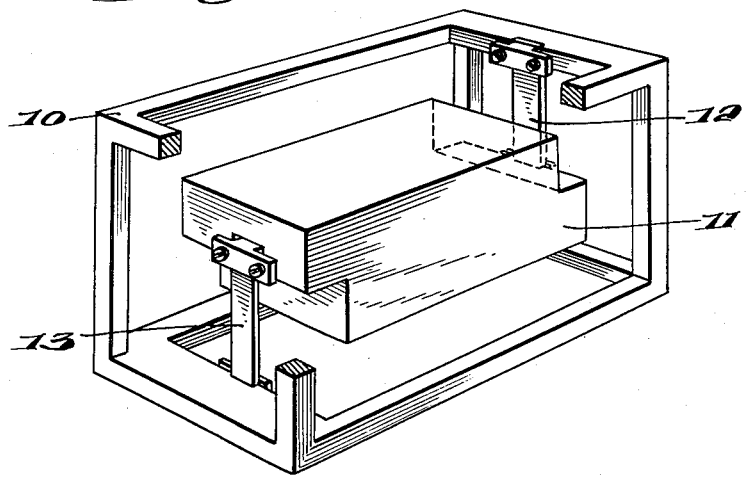

June 20, 1961  E. G. LJUNGSTRÖM  2,989,298
ELASTIC SUSPENSION DEVICE
Filed Sept. 24, 1956

INVENTOR
ERIK GUNNAR LJUNGSTRÖM,

BY Larson and Taylor

ATTORNEYS

United States Patent Office 2,989,298
Patented June 20, 1961

2,989,298
ELASTIC SUSPENSION DEVICE
Erik Gunnar Ljungström, Box 12004,
Stockholm 12, Sweden
Filed Sept. 24, 1956, Ser. No. 611,671
Claims priority, application Sweden Oct. 3, 1955
3 Claims. (Cl. 267—1)

The instant invention relates to elastic suspension devices. More in particular, the invention relates to such devices wherein a member is so supported that it is responsive only to forces in one plane and co-parallel planes. Likewise, the invention concerns such devices wherein a member is so supported that it is responsive only to moments in one plane and co-parallel planes.

An object of the instant invention is to provide an elastic suspension device wherein two members moveable in relation to each other are so inter-connected that their relative changes of position constitute a known function of a force or forces actuating the relative movement.

Another object of the invention is to provide an elastic suspension device wherein other forces disturbing the intended relative movement are compensated for such that the desired change of position between the two relatively moveable members is not influenced to any extent by the disturbing force or forces.

Additional objects of the invention will become apparent from the description hereafter and the claims appended thereto.

The elastic suspension device of the instant invention comprises two relatively moveable members fixedly inter-connected by at least one pair of elastic members oppositely disposed at the ends of one of the movable members and with respect to their points of attachment to the said moveable member.

The invention is predicated on the fact that a leaf spring which is loaded by tension means will experience an increased spring constant and thereby increased directional force, while a spring which is loaded by pressure means will experience a decreased spring constant and thereby decreased directional force. According to the invention, the relatively moveable members comprise an armature mounted within a frame, one end of the armature being suspended from the frame by elastic means, and the other end of the armature being supported on the frame by further elastic means. The respective means are oppositely disposed to each other with respect to their points of attachment on the armature. Thus, movement of the supported member or armature relative to the other member or frame is dependent solely on forces acting on the armature within one plane and co-parallel planes. Or in another embodiment movement of the armature relative to the frame depends solely on moments acting on the armature within one plane and co-parallel planes. This is achieved by having at least one leaf spring so directed in relation to the armature that the spring is tension loaded by any disturbing force, and at least one other leaf spring oppositely directed in relation to the armature such that the second spring is pressure loaded by the same disturbing force or forces. The resultant spring constant of the tension loaded spring increases to the same degree as the resultant spring constant of the pressure loaded spring decreases.

Figure 2:
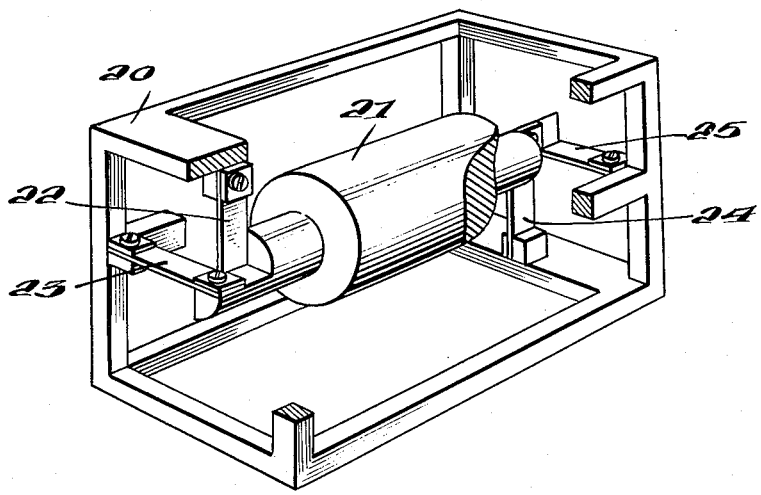

The invention will be better understood with reference to preferred embodiments illustrated in the accompanying drawing wherein:

FIGURE 1 is a perspective view illustrating an elastic suspension device of the invention capable of relative rectilinear movement, and FIGURE 2 is a perspective view illustrating the use of an elastic suspension device of the invention capable of relative rotational movement.

In the embodiment shown in FIGURE 1, the elastic suspension device of the invention can be seen to comprise a frame 10, and an armature 11, the frame and the armature being fixedly inter-connected by leaf springs 12 and 13. In accordance with the invention, leaf spring 12 can be seen to be fixedly attached to a top portion of the frame 10 and to extend downwardly in a vertical direction to a point of fixed attachment with the armature 11. At the opposite end of the armature 11, spring 13 can be seen to extend upwardly in a vertical line from a bottom portion of the frame 10 to a point of fixed attachment with the armature 11.

It is evident that displacement between the frame 10 and the armature 11 will depend only on the horizontal component of any force acting on the armature 11. For the vertical component of this force tension loads one and pressure loads the other of the springs 12 and 13. Moreover, the directional force of the tension loaded spring increases to the same degree as that of the pressure loaded spring decreases. Hence, the displacement between the frame 10 and the armature 11 is not influenced to any extent by the vertical force component.

A device according to FIGURE 1 can be used to advantage, for example, in an airplane or a vehicle when measuring the acceleration in the direction of flight or path of travel thereof. Such an accelerometer according to the principle of the invention will indicate the correct value of the acceleration and with the absence of any error caused by disturbing accelerations at angles to the direction of travel.

In a second embodiment of the invention shown in FIGURE 2, an armature 21 can be seen to be mounted within a frame 20. The two members are moveable in relation to each other by virtue of the elastic inter-connection provided by springs 22, 23, 24, and 25. The springs can be seen to be arranged in two pairs, each spring within a pair being oppositely disposed to the other spring in the pair. Thus, spring 22 extends downwardly from the frame 20 to a point of attachment with the armature 21. Spring 24 is oppositely disposed to spring 22 with respect to their points of attachment with the armature 21. By the same token, springs 23 and 25 are oppositely disposed with respect to their points of attachment on the armature 21. These springs can be seen to extend inwardly from side portions of the frame 20.

Rotation between the frame 20 and the armature 21 will depend only on those moments which act about the axis of the armature 21. Any force acting on the armature 21 and passing through its rotational axis, tension loads one and pressure loads the other spring of the respective pairs of springs. The resultant directional moment of the tension loaded spring in the pair is increased to the same extent as the directional moment of the pressure loaded spring is decreased.

A device according to FIGURE 2 can be employed, for example, when measuring rotational acceleration provided that the distribution of mass of the armature is symmetrical, relative to its rotational axis. The moment on the armature 21 will equal the product of the moment of inertia and the rotational acceleration experienced by the armature about its rotational axis. The angle of turn between the frame 20 and the armature 21 will thus be determined by the acceleration of rotation about the rotational axis and will not be influenced by forces acting on the armature 21 through its rotational axis. Accordingly, the correct value of rotation acceleration will be indicated without error caused by linear disturbances.

If the armature 21 of a device according to FIGURE 2 is employed as a gyroscope, the rotor shaft of which is oriented in a suitable way, the device may be used for measuring angular speed. Linear disturbances would not influence the resultant measure of angular speed.

The illustrated embodiments employ elastic members comprising simple straight leaf springs. It is evident however that the elastic member in accordance with the invention may comprise some other appropriate type of spring.

The invention can also be applied to devices having armatures or isolating masses which are asymmetrical in relation to their points of gravity, with respect to the means disclosed herein for compensating for the influence of undesirable disturbing forces.

Although the invention has been described in considerable detail with reference to certain preferred embodiments thereof, it will be understood that variations and modifications can be effected without departing from the spirit and scope of the invention as described hereinabove and as defined in the appended claims.

I claim:

1. An elastic suspension device comprising two relatively movable members, the first of the members extending along a longitudinal axis and the second of the members having first portions disposed adjacent opposite ends of the first member and on opposite sides of a first axial plane thereof, and a first pair of substantially parallel and oppositely disposed bar springs of substantially equal length the end portions of which are rigidly connected to the ends of the first member and to the respective first portions.

2. An elastic suspension device according to claim 1 wherein the second member has second portions disposed adjacent the opposite ends of the first member and on opposite sides of a second axial plane thereof, the second axial plane being perpendicular to the first axial plane, and further comprising a second pair of substantially parallel and oppositely disposed bar springs of substantially equal length the end portions of which are rigidly connected to the ends of the first member and to the respective second portions, the second pair of bar springs being disposed perpendicular to the first pair of bar springs.

3. An elastic suspension device according to claim 1 wherein the two relatively movable members comprise an armature mounted within a frame.

References Cited in the file of this patent

UNITED STATES PATENTS

| | | |
|---|---|---|
| 392,617 | Lieb et al. | Nov. 13, 1888 |
| 1,173,850 | Oliver | Feb. 29, 1916 |
| 1,602,966 | Ellzey | Oct. 12, 1926 |
| 2,614,508 | Archambault | Oct. 21, 1952 |
| 2,649,294 | Walter | Aug. 18, 1953 |
| 2,675,525 | Wiancko | Apr. 13, 1954 |
| 2,753,176 | List | July 3, 1956 |
| 2,757,050 | Weber et al. | July 31, 1956 |